Feb. 3, 1948. W. C. EAVES 2,435,535
SOUND PROJECTING APPARATUS
Filed Jan. 10, 1944 8 Sheets-Sheet 1

INVENTOR.
William C. Eaves
BY
F. Bascom Smith
ATTORNEY

Feb. 3, 1948.       W. C. EAVES       2,435,535
SOUND PROJECTING APPARATUS
Filed Jan. 10, 1944       8 Sheets-Sheet 3

INVENTOR.
William C. Eaves
BY
F. Bascom Smith
ATTORNEY

Feb. 3, 1948.  W. C. EAVES  2,435,535
SOUND PROJECTING APPARATUS
Filed Jan. 10, 1944  8 Sheets-Sheet 4

INVENTOR.
William C. Eaves
BY
F. Bascom Smith
ATTORNEY

Feb. 3, 1948.  W. C. EAVES  2,435,535
SOUND PROJECTING APPARATUS
Filed Jan. 10, 1944  8 Sheets-Sheet 5

INVENTOR.
William C. Eaves
BY
F. Bascom Smith
ATTORNEY

Patented Feb. 3, 1948

2,435,535

UNITED STATES PATENT OFFICE 2,435,535

SOUND PROJECTING APPARATUS

William C. Eaves, Elyria, Ohio, assignor to Eaves Sound Projectors, Inc., Dover, Del., a corporation of Delaware Application January 10, 1944, Serial No. 517,628

4 Claims. (Cl. 181—27)

This invention relates to sound projecting apparatus, and more particularly to horns, or trumpets that are associated therewith for receiving and distributing sound produced by said apparatus over a large area.

One object of the present invention is to provide a trumpet of novel construction and having a passage extending therethrough for the sound waves which increases exponentially toward and to the mouth of said trumpet.

Another object of the invention is to provide a novel trumpet constructed in a plurality of sections whereby manufacture thereof with a passage therein of proper exponential curvature is facilitated.

Another object is to provide a novel trumpet constructed in a plurality of detachable sections whereby damaged portions thereof may be easily repaired or replaced.

Another object is to provide a novel trumpet comprising a plurality of sections, certain or all of which are castings, thereby having greater rigidity to oppose the many stresses created by high amplitude vibrations, and other shock stresses that the trumpet is liable to be subjected to.

A further object is to provide a trumpet comprising a plurality of co-axially arranged sections which, through novel construction thereof and provision of novel clamping means, are firmly secured together in concentric relation and such that a tight seal between the engaging ends of adjacent sections is insured.

Another object is to provide novel clamping means for securing sections of a trumpet together which applies clamping pressure around the entire peripheries of engaging ends of adjacent sections, heretofore not obtainable by the conventional flange and bolt method, resulting in added structural strength.

A still further object is to provide a multiple unit trumpet having novel junction means for blending the air columns of said units into a common air column and in a manner such that perfect wave form is assured, thereby eliminating the usual wave form distortion produced in other types of multiple unit trumpets.

Still another object is to provide novel sectional single and multiple unit trumpets having certain interchangeable sections which enables standardization of said sections and also facilitates manufacture.

The above and further objects and novel features of the invention will more fully appear from the following detailed description when the same is read in connection with the accompanying drawings which illustrate several embodiments of said invention. It is to be expressly understood, however, that the drawings are for the purpose of illustration only and are not intended to limit the invention to said embodiments or otherwise, as changes may be made in the design and arrangement of the parts illustrated without departing from the spirit and scope of the invenition, as will be clear to those skilled in the art. For a definition of the limits of the invention, reference is had primarily to the appended claims.

In the drawings, wherein like reference characters refer to like parts throughout the several views.

Broadly stated, the single and multiple unit trumpets contemplated by the present invention, each comprises a plurality of detachable sections constructed of certain materials and in a manner whereby a trumpet is provided having a passage therein of proper exponential curvature for the sound waves resulting in superior performance, and greater rigidity to withstand the many stresses created by high amplitude vibrations, and other shock stresses, and one which may be disassembled for storing and shipping purposes within a minimum amount of space, and to repair or replace any damaged part thereof. Further, the multiple unit trumpets are capable of distributing the sound over a larger space angle and with greater intensity than the single unit trumpet, and this is accomplished, free from distortion, by conveying the waves emanating from the sound projecting apparatus first in spaced paths parallel to a common longitudinal central axis, and then blending the individual waves moving in a common plane into a common wave front at exactly the same point or phase of the wave at the instant of blending, thus assuring perfect wave form in the bell of the trumpet, and eliminating the usual wave form distortion resulting in other types of multiple unit trumpets due to standing waves and phase distortion created by the waves moving in at an angle toward each other, or merging at different points on the several wave forms.

Figures 1, 2, 3, 4:
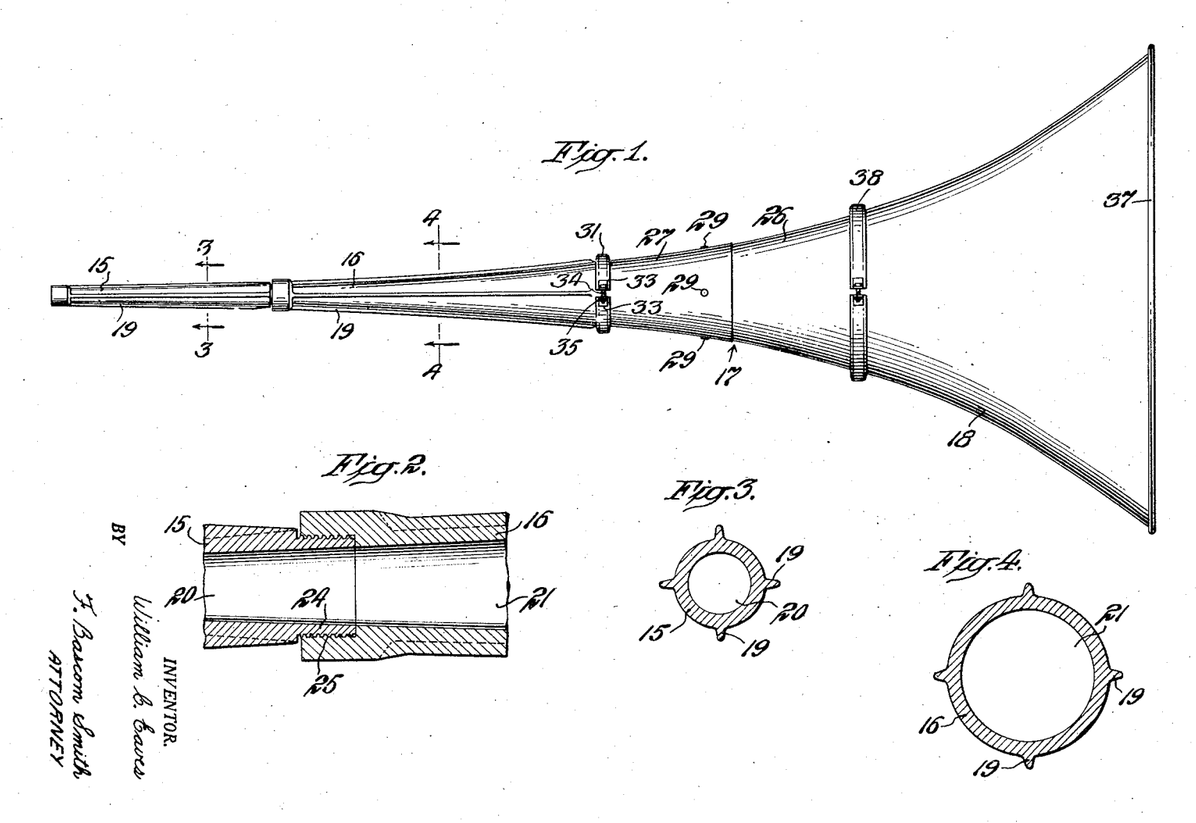
Fig. 1 is a side elevation of a single unit trumpet embodying the present invention.
Fig. 2 is an enlarged fragmentary longitudinal sectional view of the first and second throat sections illustrated in Fig. 1, showing the threaded connection between said sections.
Fig. 3 is an enlarged transverse sectional view on the line 3—3 of Fig. 1.
Fig. 4 is an enlarged transverse sectional view on the line 4—4 of Fig. 1.

Referring first to Figs. 1 to 6 inclusive, the novel single unit trumpet therein shown, comprises a first throat section 15, a second throat section 16, a bell mounting section 17, and a bell section 18 (Fig. 1). Sections 15 and 16 are each preferably formed as an elongated circular casting of a suitable metal, such as aluminum or malleable iron, having a plurality of strengthening ribs 19 (Figs. 3 and 4) suitably spaced around, and extending along, the same. Sections 15 and 16 are also formed with exponentially curved central passages 20 and 21, respectively (Fig. 2), that extend through the entire length thereof and provide, when said sections are connected together, as hereinafter described, one continuous, exponentially curved passage for the sound waves produced by a sound head (not shown), preferably of the air flow type disclosed in my United States Patent No. 2,371,960, granted March 20, 1945, which is secured to the free end of section 15. Section 16 is further formed at its larger end with an outwardly projecting flange or rim 22 (Fig. 5) one side of which is tapered, as indicated at 23, for a purpose to be hereinafter described.

Sections 15 and 16 are connected together in a manner whereby a tight seal between said sections, and an unbroken interior exponential curvature, is obtained. As shown in Fig. 2, section 15 is preferably formed on one end thereof with an externally threaded reduced portion 24, and section 16 is formed on the adjacent end thereof with a suitable internally threaded opening 25 to receive the threaded portion 24 of section 15 for firmly connecting the sections together and in concentric relation whereby the passages 20 and 21 therein will register in accurate axial alinement with each other.

Figure 5:
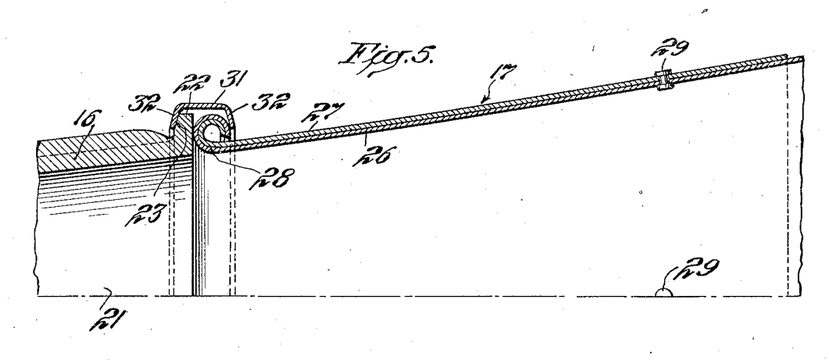
Fig. 5 is an enlarged fragmentary longitudinal sectional view of the second throat and bell mounting sections, and the clamping means therefor, illustrated in Fig. 1.

The bell mounting section 17 is of novel construction so that light weight materials, such as thin gage sheet steel or aluminum, may be used without sacrificing strength, thereby decreasing the weight of said section, as well as, the total weight of the trumpet. As shown in Fig. 5, the bell mounting section 17 comprises an exponentially curved cylindrical inner shell 26 having spun thereover, for a portion of its length, an outer shell 27 for additional strength and to prevent segmental vibrations in the metal from the volume of the sound. After shell 27 is spun over shell 26, both of said shells are beaded together at the smaller ends, as indicated at 28, thereby forcing said outer shell forward relative to said inner shell to insure a good tight fit. Shells 26 and 27 may then be riveted together, if desired, by rivets 29. Shell 26 is also formed at its larger end with a strengthening bead or rim 30 (Fig. 6).

Novel clamping means are provided for connecting sections 16 and 17 together which applies clamping pressure around the entire peripheries of the engaging ends of said sections, thereby not only effecting a tight seal between said sections, but also providing a joint which is of considerable strength to withstand the many stresses created by high amplitude vibrations, as well as, other shock stresses that the trumpet is liable to be subjected to. As shown, the clamping means comprises a double-ended, channel shaped ring or band 31 (Fig. 5) of a suitable metal, such as thin gage sheet steel, having diverging side walls 32. Ring 31 has welded or otherwise suitably secured to its opposite ends a pair of angle plates 33 having suitable openings therein to receive a ring tightening bolt 34 and nut 35 (Fig. 1). When the ring 31 is engaged over the tapered flange 22 of section 16 and the circular bead 28 of section 17, and drawn up by the bolt 34, said sections, due to the angularity of the side walls 32 of said ring, will be drawn axially toward each other, thus forming a tight seal around the entire peripheries of the sections and firmly securing the latter together and in concentric relation whereby the interior of the shell 26 will accurately register with the passage 21 in section 16.

Figure 6:
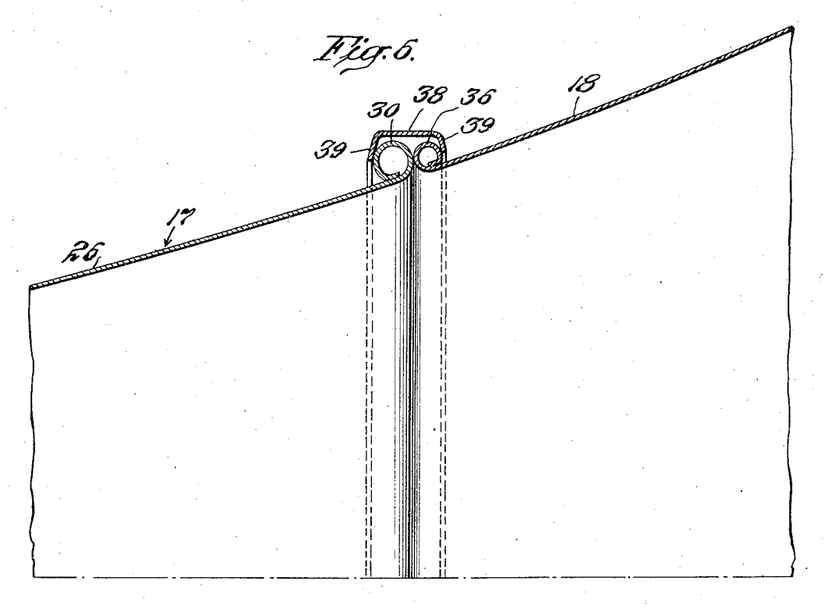
Fig. 6 is an enlarged fragmentary longitudinal sectional view of the bell mounting and bell sections, and clamping means therefor, illustrated in Fig 1.
Figure 7:
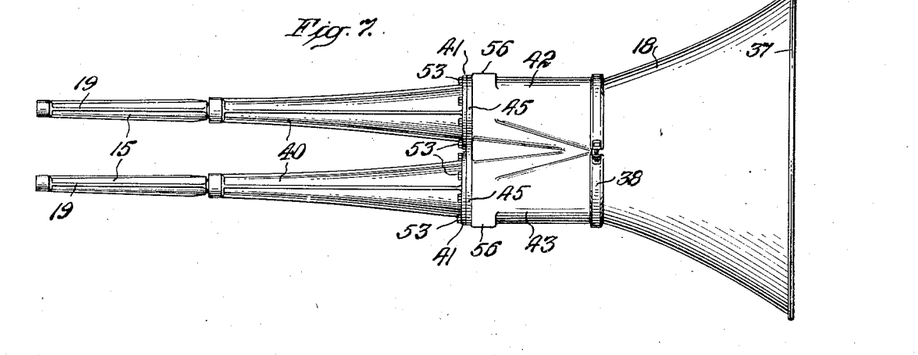
Fig. 7 is a side elevation of a two unit trumpet embodying the present invention.

The bell section 18, preferably comprises an exponentially curved cylindrical shell of a suitable metal, such as thin gage sheet steel or aluminum, formed at its opposite ends with strengthening beads or rims 36 and 37 (Figs. 1 and 6). Bell section 18 forms a continuation of section 17 and is firmly secured to the latter by a clamping ring 38 which is engaged over the beads 30 and 36, respectively, of said sections. Ring 38, like ring 31 hereinbefore described, is channel shaped having diverging side walls 39, one of said walls, however, being of less depth to provide sufficient clamping clearance between the end thereof and the section 18. When ring 38 is engaged with the circular beads 30 and 36, and tightened, the sections 17 and 18 will, due to the wedging action of said ring, be drawn axially toward each other, thus forming a tight seal around the entire peripheries of said sections and firmly securing the latter together and in concentric relation.

The single unit trumpet is supported in operative relation to the sound producing apparatus, and in a balanced manner, by mounting or positioning members (not shown) which are connected with said trumpet in the vicinity of the clamping ring 31, the bell mounting section 17 having sufficient rigidity and strength to receive said mounting members and also support the sections 15, 16 and 18.

Referring now to Figs. 7 to 10 inclusive, the two unit trumpet therein shown and contemplated by the present invention, comprises a pair of first throat sections 15 and a pair of second throat sections 40. The throat sections 40, except for a larger diameter flange 41 formed on the larger ends thereof, are identical in construction and connected in the same manner with the sections 15 as the section 16 hereinbefore described, and illustrated in Figs. 1 and 2 of the first embodiment. Sections 15 and 40 provide two separate first and second throat units which are disposed in spaced parallel relation whereby the sound waves produced by two sound heads (not shown), preferably of the air flow type disclosed in the above-mentioned U. S. Patent No. 2,371,960, connected with the sections 15 will be projected in two spaced paths parallel to a common longitudinal central axis.

Novel junction means are provided for supporting the throat units 15, 40 in the aforesaid spaced relation and with the ends thereof in exact alinement, and for blending the spaced waves emanating therefrom on a common plane into a common wave front at a predetermined point, thereby assuring perfect wave form from said point outward without the usual wave form distortion resulting in trumpets heretofore provided. As shown, the junction means comprises a body cast of a suitable metal, such as aluminum or malleable iron, and having two flared sections 42 and 43 of the same length and which are disposed on opposite sides of the longitudinal central axis of the body. Sections 42 and 43 terminate in an outwardly projecting flange or rim 44 that is common to both said sections, and are formed at the smaller ends thereof with outwardly projecting flanges 45 which are joined together as at 46 (Fig. 9).

Figures 8, 9:
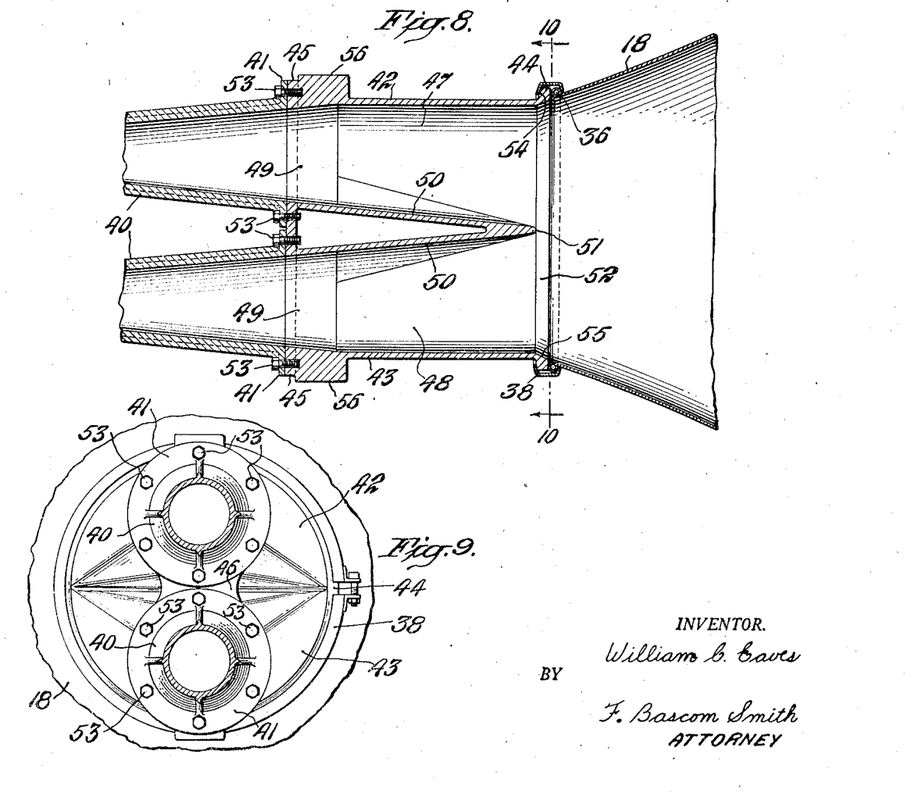
Fig. 8 is an enlarged fragmentary longitudinal sectional view of the trumpet illustrated in Fig. 7.
Fig. 9 is an end view, partly in section, looking from the left of Fig. 8.
Figures 10, 11:
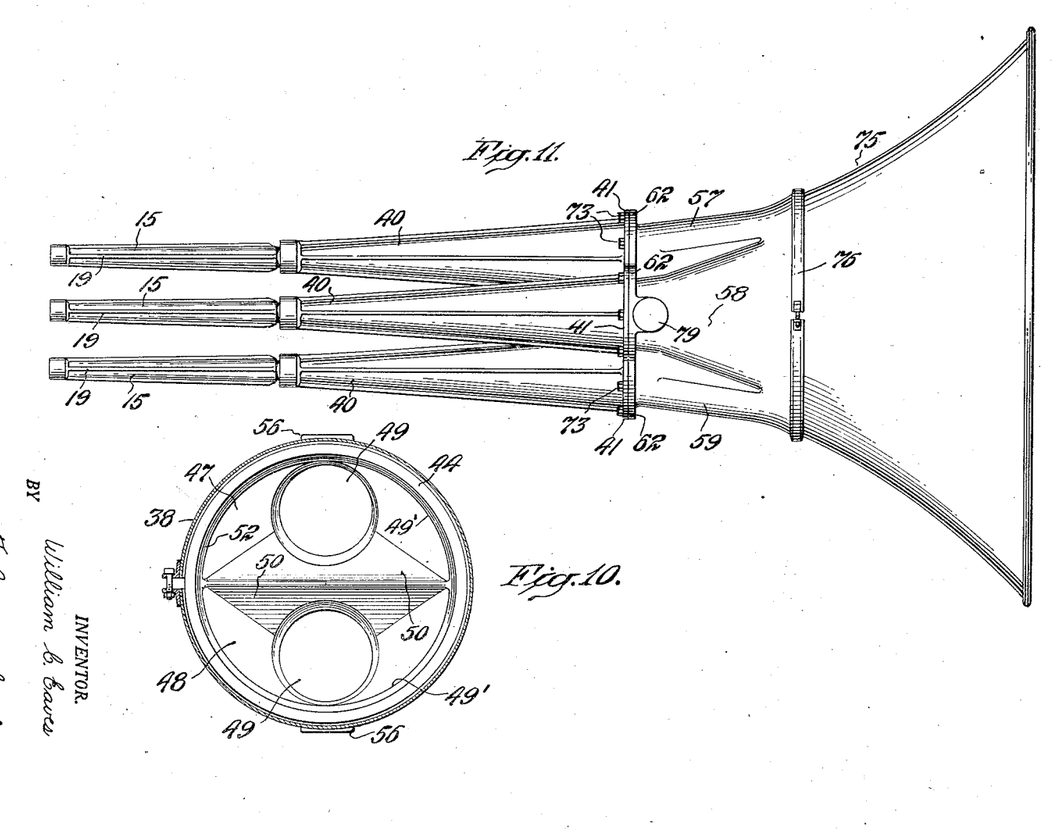
Fig. 10 is a transverse sectional view on the line 10—10 of Fig. 8.
Fig. 11 is a side elevation of a four unit trumpet embodying the present invention, only three of the throat sections being visible.

As viewed in Figs. 8 and 10, sections 42 and 43 provide two exponentially curved throats or chambers 47 and 48, respectively, each including a circular inlet 49, and a wall 50 which tapers from said inlet towards the longitudinal central axis of the junction body, the walls 50 blending together in a plane containing said axis, and at a point, as indicated at 51, a short distance to the rear of the outer face of the flange 44, thus forming, at said point, segmental shaped outlets 49' in the throats 47 and 48 which merge at the point 51 into one common circular outlet or chamber 52 formed in the junction body. The inlets 49 and the outlets 49' are disposed in a plane, and said outlets are of such formation that the exponential curvature in the body at the merging point of the throats 47, 48 is the exact exponential continuation of the exponential curvatures of said two throats combined, and that the combined cross-sectional areas of said outlets is equal to the cross-sectional area of the outlet 52 at the merging point of the outlets 49', thus maintaining not only exponential curvature, but also a constant rate of increase in volumetric areas within the trumpet. The throat units 15, 40 are bolted to the sections 42 and 43 in accurate axial alinement with the inlets 49 of chambers 47 and 48 by bolts 53 which extend through suitable openings in the flanges 41 and are threaded in suitable openings in the flanges 45.

It will thus appear that with the construction thus far described, the throat units 15, 40 project the air vibrations in a parallel direction into the chambers 47 and 48, thereupon creating two wave fronts that move in a common plane toward the outlet 52, blending into one common wave front at exactly the same point or phase of the wave at the point 51 in said outlet. In this manner perfect wave form from the point 51 outward is assured without the usual wave form distortion that has resulted in other types of multiple unit trumpets due to standing waves and phase distortion produced by the wave fronts moving in at an angle, instead of on a common axis, and the merging of "out of phase" waves.

A bell section 18 is firmly secured to the junction 42, 43, and in concentric relation with the outlet 52 by a clamping ring 38 which is engaged with the circular bead 36 of said section, and the flange 44 of said junction, said flange being tapered, as indicated at 54, on one side thereof in the same manner as the flange 22 illustrated in Fig. 5 of the first embodiment. Outlet 52 is flared, as indicated at 55, to provide for smooth transition of the sound waves from said outlet into the bell section 18.

The junction 42, 43 is formed with two diametrically opposite pads or bosses 56 to receive mounting or positioning members (not shown) for supporting the entire two unit trumpet in a balanced manner and in operative relation with the sound projecting apparatus, said junction having sufficient strength and rigidity to receive said mounting members and also to support the two throat units 15, 40 and the bell section 18.

The four unit trumpet illustrated in Figs. 11 to 14, inclusive, and contemplated by the present invention, comprises four first throat sections 15 and four second throat sections 40 which provide four separate first and second throat units that are disposed in spaced parallel relation whereby the sound waves produced by four sound heads (not shown), preferably of the air flow type disclosed in the above-mentioned U. S. Patent No. 2,371,960, connected with the sections 15 will be projected in four spaced paths parallel to a common longitudinal central axis.

Novel junction means are provided for supporting the four throat units 15, 40 in the aforesaid spaced relation and with the ends thereof in exact alinement, and for blending the spaced waves emanating therefrom on a common plane into a common wave front at a predetermined point. As shown, said junction means comprises a body cast of a suitable metal, such as aluminum or malleable iron, having four flared sections 57, 58, 59, and 60 of the same length and which are formed integral with each other and disposed 90° apart around the longitudinal central axis of said body. These sections terminate at their larger ends in an outwardly projecting flange 61 that is common to all said sections, and are provided at their smaller ends with outwardly projecting flanges 62 formed integral with each other.

Figure 12:
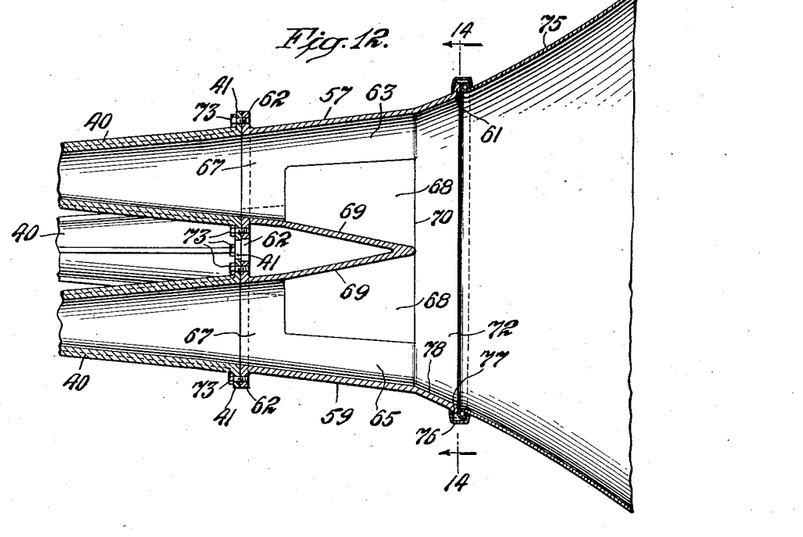
Fig. 12 is an enlarged fragmentary longitudinal sectional view of the trumpet illustrated in Fig. 11.
Figure 14:
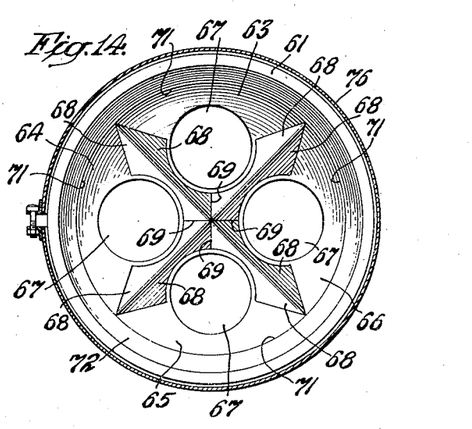
Fig. 14 is a transverse sectional view on the line 14—14 of Fig. 12.
Figure 15:
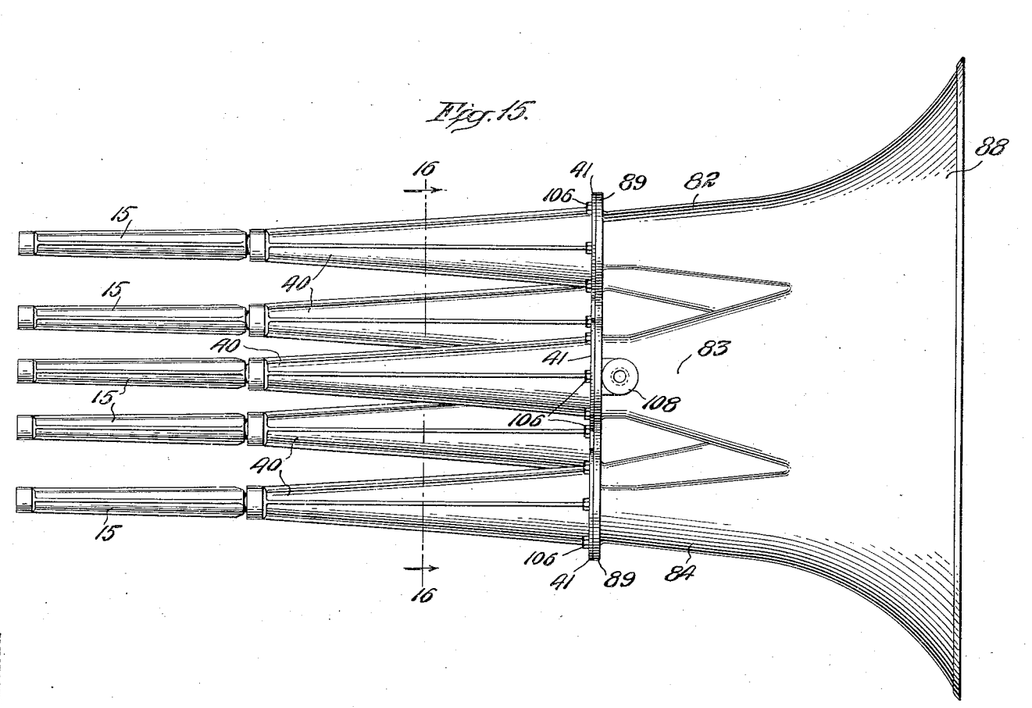
Fig. 15 is a side elevation of an eight unit trumpet embodying the present invention, only five of the throat sections being visible.

As shown in Figs. 12 and 14, sections 57, 58, 59, and 60 provide four exponentially curved chambers or throats 63, 64, 65, and 66, respectively, each including a circular inlet 67, and V-shaped walls 68 diverging from said inlet and with the apex 69 thereof inclined towards the longitudinal central axis of the junction body. The walls 68 of the individual chambers blend with the walls of adjacent chambers at a point 70 somewhat to the rear of the outer face of the flange 61, and the apexes 69 of said walls blend together at said point and in a plane containing the longitudinal central axis of the junction body, thus forming at the point 70 sector shaped outlets 71 in the chambers 63, 64, 65, and 66 which merge at said point into one common circular outlet or chamber 72 formed in the junction body. The inlets 67 and the outlets 71 are disposed in a plane, and said outlets are of such formation that the exponential curvature in the body at the merging point of the throats 63, 64, 65, and 66 is the exact exponential continuation of the exponential curvatures of said four throats combined, and that the combined cross-sectional areas of said outlets is equal to the cross-sectional area of the outlet 72 at the merging point of the outlets 71, thus maintaining not only exponential curvature, but also a constant rate of increase in volumetric area within the trumpet.

Figure 13:
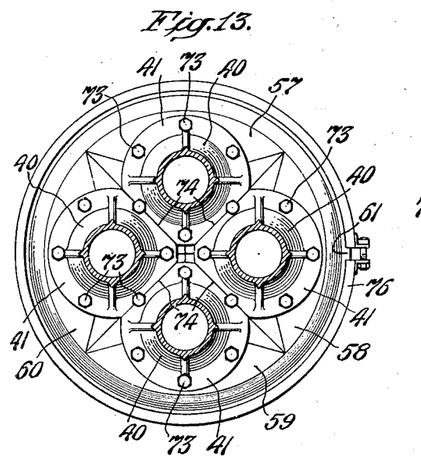
Fig. 13 is an end view, partly in section, looking from the left of Fig. 12.

The individual throat units 15, 40, are bolted to the individual sections 57, 58, 59, and 60 in accurate axial alinement with the inlets 67 of chambers 63, 64, 65, and 66 by bolts 73 which extend through the openings in the flanges 41 and are threaded in suitable openings in the flanges 62. To enable nesting of the throat units, the flanges 41 have portions thereof removed, as indicated at 74 (Fig. 13).

With the construction thus far described, it will be noted that the four throat units 15, 40 project the air vibrations into the inlets 67 of the individual chambers 63, 64, 65, and 66 in four spaced paths parallel to the longitudinal central axis of the junction body, thereupon creating four wave fronts that move in a common plane toward the outlet 72, blending in phase into one common wave front at the point 70 in said outlet. In this manner perfect wave form from the point 70 outward is assured without the usual wave form distortion produced in other types of multiple unit trumpets by the individual waves merging at an angle and out of phase.

The junction body has secured thereto an exponentially curved bell section 75 which, except for size, is identical in construction as the bell section 18 hereinbefore described, and illustrated in the first and second embodiments. Bell 75 is firmly secured to the junction body and in concentric relation with the outlet 72 thereof by a clamping ring 76 which, except for size, is identical in construction as the clamping ring 31 illustrated and described in the first embodiment. Ring 76 is engaged with the circular bead of the bell section 75 and the flange 61 of the junction body, said flange being tapered, as indicated at 77, on one side thereof in the same manner as the flanges 22 and 44 illustrated in Figs. 5 and 8 of the first and second embodiments, respectively. Outlet 72 is flared, as indicated at 78, to provide for smooth transition of the sound waves from said outlet into the bell section 75.

The junction body is formed with two diametrically opposite pads or bosses 79 (Fig. 11) to receive mounting or positioning members (not shown) for supporting the entire four unit trumpet in a balanced manner and in operative relation with the sound projecting apparatus, said junction body having sufficient strength and rigidity to receive said mounting members and also to support the four throat units 15, 40 and the bell section 75.

Referring now to Figs. 15 to 19 inclusive, the multiple unit trumpet therein shown and contemplated by the present invention, comprises eight first throat sections 15, and eight second throat sections 40 which provide eight separate first and second throat units that are disposed in spaced parallel relation whereby the sound waves produced by eight sound heads (not shown), preferably of the air flow type disclosed in the above-mentioned U. S. Patent No. 2,371,960, connected with the sections 15 will be projected in eight spaced paths parallel to a common longitudinal central axis.

Figure 16:
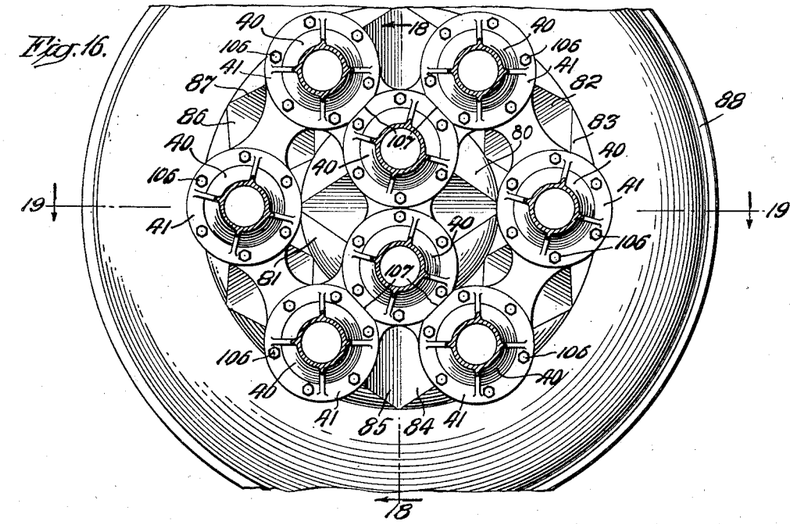
Fig. 16 is a transverse sectional view on the line 16—16 of Fig. 15.

Novel junction means are provided for supporting the eight throat units 15, 40 in the aforesaid spaced relation and with the ends thereof in exact alinement, and for blending the spaced waves emanating therefrom on a common plane into a common wave front at a predetermined point. As shown, said junction means comprises a body cast of a suitable metal, such as malleable iron, having two flared sections 80 and 81 of the same length and which are disposed on opposite sides of the longitudinal central axis of said body, and six flared sections 82, 83, 84, 85, 86, and 87 of the same length and which are disposed 60° apart around the sections 80 and 81 (Fig. 16). Sections 82 to 87 terminate at their larger ends in an exponentially curved bell 88 which is formed integral with the junction body, and said sections and the sections 80 and 81 are provided at their smaller ends with outwardly projecting flanges 89 formed integral with each other.

Figure 17:
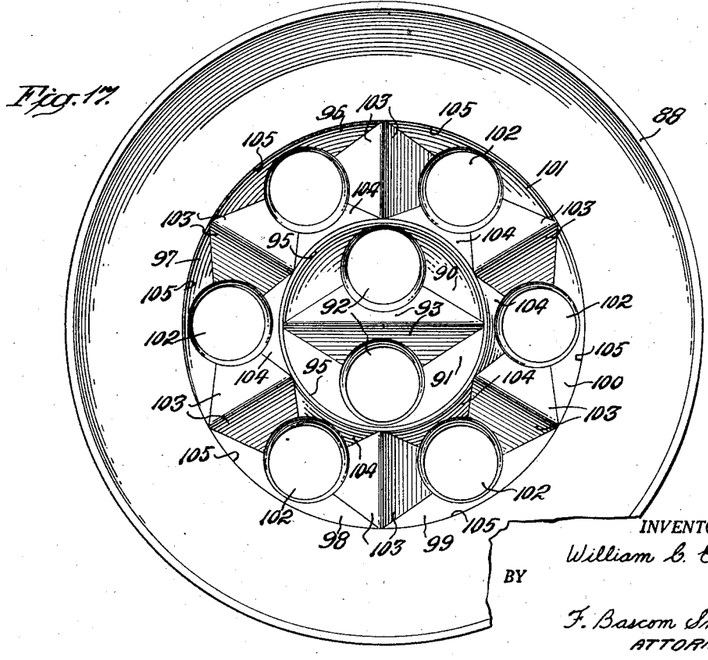
Fig. 17 is an end view looking from the right of Fig. 15.
Figure 18:
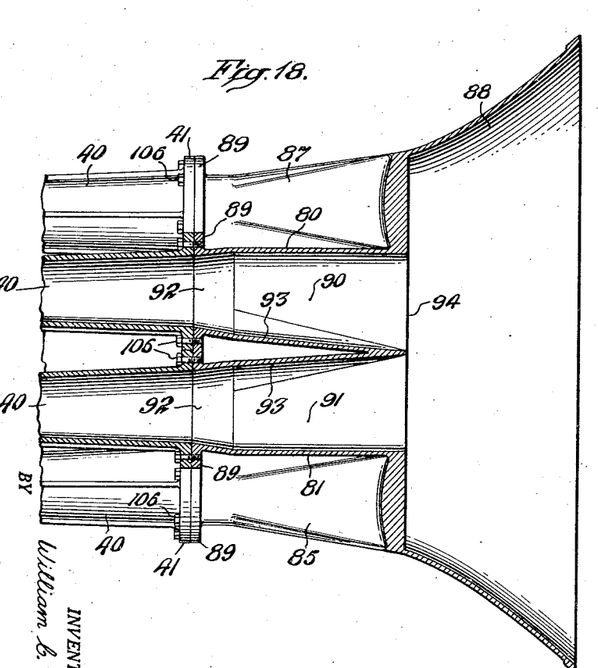
Fig. 18 is a vertical sectional view on the line 18—18 of Fig. 16.
Figure 19:
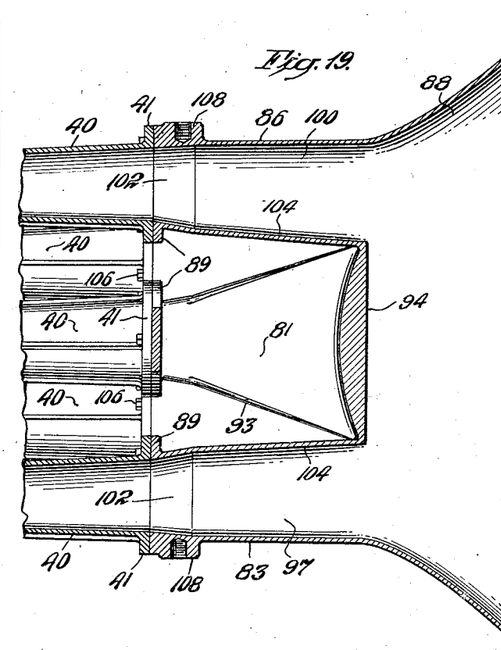
Fig. 19 is a horizontal sectional view on the line 19—19 of Fig. 16.

As viewed in Figs. 17, 18 and 19, sections 80 and 81 provide two exponentially curved throats or chambers 90 and 91, respectively, each including a circular inlet 92, and a wall 93 which tapers from said inlet towards the longitudinal central axis of the junction body, the walls 93 blending together in a plane containing said axis, and at a point, indicated at 94, a determined distance to the rear of the mouth of the bell 88, thus forming at said point segmental shaped outlets 95 in the chambers 90 and 91 (Fig. 17). Sections 82 to 87 provide six exponentially curved chambers or throats 96, 97, 98, 99, 100, and 101, respectively, each including a circular inlet 102, diverging side walls 103, and a bottom wall 104 which tapers from said inlet towards the outlets 95 of chambers 90 and 91. The side walls 103 of the individual chambers blend with the side walls of the adjacent chambers at the point 94, and the bottom walls 104 blend with the outer walls of the chambers 90 and 91 also at said point, thus forming elongated or rectangular shaped outlets 105 in the chambers 96 to 101 which, together with the outlets 95, merge at the point 94 into one common circular outlet comprising the inlet of the bell 88.

The inlets 92 and 102, and the outlets 95 and 105 are disposed in a plane, and said outlets are of such formation that the exponential curvature in the body at the merging point of the chambers 80, 81 and 96 to 101 is the exact exponential continuation of the exponential curvatures of said eight chambers combined, and that the cross-sectional areas of all said outlets combined is equal to the cross-sectional area of the bell 88 at the point 94, thus maintaining not only exponential curvature, but also a constant rate of increase in volumetric area within the trumpet. The individual throat units 15, 40 are bolted to the individual sections 80 to 87 in accurate axial alinement with the inlets 92 and 102 by bolts 106 which extend through the openings in the flanges 41 and are threaded in suitable openings in the flanges 89. To enable nesting of the throat units, certain of the flanges 41 have portions thereof removed, as indicated at 107 (Fig. 16).

It will thus be noted that the eight throat units project the air vibrations into the inlets 92 and 102 in eight spaced paths parallel to the longitudinal central axis of the junction body, thereupon creating eight wave fronts that move in a common plane toward the bell 88, blending in phase into one common wave front at the point 94 in said bell. In this manner perfect wave form from the point 94 outward is assured without the usual wave form distortion produced in other types of multiple unit trumpets by the individual waves merging at an angle and out of phase.

The junction body is formed with two diametrically opposite pads or bosses 108 (Fig. 19) to receive mounting or positioning members (not shown) for supporting the entire eight unit trumpet in a balanced manner and in operative relation with the sound projecting apparatus, said junction body having sufficient strength and rigidity to receive said mounting members and also to support the eight throat units 15, 40.

There is thus provided single and multiple unit trumpets having superior acoustic performance, and which are constructed in a plurality of sections, certain or all of which are castings, thereby having greater rigidity to withstand the many stresses created by high amplitude vibrations, as well as, other shock stresses. Also, the sectional construction enables manufacture of the trumpets from various metals, it enables making the smaller sections, for example, the sections 15, 16, and 40, as castings so that a passage therein of proper exponential curvature may be obtained, it facilitates repair or replacement of any damaged section thereof, and enables storing and shipping of the trumpets in less space. In addition, certain of the sections, such as the first throat sections 15, of the single and multiple unit trumpets are interchangeable, thereby simplifying manufacture, and enabling substitution of other sections of like construction, but of different lengths, to accommodate sound heads of various capacities. Further, the multiple unit trumpets, in addition to the above-mentioned features, are capable of distributing the sound over a larger space angle and with greater intensity than the single unit trumpet, and without the usual distortion present in multiple unit trumpets heretofore provided.

What is claimed is:

1. An acoustic device comprising a body having therein a plurality of relatively spaced, exponentially curved passages extending longitudinally thereof, said passages each having a circular inlet, a circular chamber in said body and common to all said passages, said passages opening into said chamber and having oulets disposed in a single plane and of a formation whereby exponential curvature in the body at said outlets is the exact exponential continuation of the exponential curvatures of said passage combined, and the combined cross-sectional area of said outlets is equal to the cross-sectional area of said chamber, and a plurality of elongated sections disposed in spaced parallel relation and secured to said body, said sections each having therein a passage curving exponentially from the inlet to the outlet thereof and registering with the inlets of the passages in said body, the inlets of all said sections being arranged in a single plane.

2. An acoustic device comprising a body having therein two exponentially curved passages disposed in spaced relation on opposite sides of and extending along the longitudinal central axis of said body, said passages each having a circular inlet and a segmental-shaped outlet, said outlets merging together at a predetermined point in a plane containing said axis and providing at said point exponential curvature in said body which is the exact exponential continuation of the exponential curvatures of said two passages combined, a circular chamber in said body and common to both of said passages at the outlets thereof, said chamber having a cross-sectional area equal to the cross-sectional areas of said two outlets combined, a pair of elongated sections disposed in spaced parallel relation and secured to said body, said sections each having therein a passage curving exponentially from the inlet to the outlet thereof and registering with the inlets of the passages in said body, the inlets of said sections being arranged in a single plane, and a bell section secured to said body adjacent the chamber therein.

3. An acoustic device comprising a body having therein four exponentially curved passages equally spaced around and extending along the longitudinal central axis of said body, said passages each having a circular inlet and a sector-shaped outlet, said outlets merging together at a predetermined point and in a plane containing said axis and providing at said point exponential curvature in said body which is the exact exponential continuation of the exponential curvatures of said four passages combined, a circular chamber in said body and common to all said passages at the outlets thereof, said chamber having a cross-sectional area equal to the cross-sectional areas of said outlets combined, four elongated sections disposed in spaced parallel relation and secured to said body, said sections each having therein a passage curving exponentially from the inlet to the outlet thereof and registering with the inlets of the passages in said body, the inlets of all said sections being arranged in a single plane, and a bell section secured to said body adjacent the chamber therein.

4. An acoustic device comprising a body having therein a pair of exponentially curved passages disposed on opposite sides of and extending along the longitudinally central axis of said body and six similar passages equally spaced around said pair of passages, all said passages having circular inlets, a bell formed integral with said body and common to all said passages, said passages opening into said bell and having outlets disposed in a plane and of a formation whereby exponential curvature in said body at said outlets is the exact exponential continuation of the exponential curvatures of all said passages combined, and the combined cross-sectional area of all said outlets is equal to the cross-sectional area of said bell at inlet end thereof, and eight elongated sections disposed in spaced parallel relation and secured to said body, said sections each having therein a passage curving exponentially from the inlet to the outlet thereof and registering with the inlets of the passages in said body, the inlets of all said sections being arranged in a single plane.

WILLIAM C. EAVES.

(References on following page)

REFERENCES CITED

The following references are of record in the file of this patent:

UNITED STATES PATENTS

| Number | Name | Date |
|---|---|---|
| 233,145 | Demarest | Oct. 12, 1880 |
| 685,409 | Osten et al. | Oct. 29, 1901 |
| 712,012 | Smith et al. | Oct. 28, 1902 |
| 1,684,975 | Slepian | Sept. 18, 1928 |
| 1,715,703 | Hanna | June 4, 1929 |
| 1,730,425 | Harrison | Oct. 8, 1929 |
| 1,768,226 | Williams | June 24, 1930 |
| 1,834,327 | Abrahams | Dec. 1, 1931 |
| 1,852,793 | Scrantom | Apr. 5, 1932 |
| 1,853,955 | Blattner | Apr. 12, 1932 |
| 2,018,740 | Pellegatti | Oct. 29, 1935 |
| 2,058,208 | Blattner | Oct. 20, 1936 |
| 2,071,153 | Abrahams | Feb. 16, 1937 |
| 2,089,391 | Marion | Aug. 10, 1937 |
| 2,269,664 | Hallerberg | Jan. 13, 1942 |
| 2,271,425 | Harris | Jan. 27, 1942 |
| 2,273,210 | Lowther et al. | Feb. 17, 1942 |

FOREIGN PATENTS

| Number | Country | Date |
|---|---|---|
| 461,721 | Germany | June 28, 1928 |